United States Patent [19]

Brandelli

[11] 3,729,017
[45] Apr. 24, 1973

[54] FLOW-CONTROL DEVICE

[76] Inventor: Anthony R. Brandelli, 2418 W. 256th St., Lomita, Calif. 90717

[22] Filed: Sept. 21, 1970

[21] Appl. No.: 73,882

Related U.S. Application Data

[63] Continuation of Ser. No. 726,164, May 2, 1968, abandoned.

[52] U.S. Cl.................................137/414, 137/432
[51] Int. Cl................................................F16k 31/18
[58] Field of Search......................137/413, 414, 429, 137/430, 432, 433, 436, 441, 217; 4/28, 29; 73/322.5; 251/35

[56] References Cited

UNITED STATES PATENTS

| | | | |
|---|---|---|---|
| 3,074,684 | 1/1963 | Doyle | 137/217 X |
| 3,255,773 | 6/1966 | McQueen | 251/46 X |
| 3,464,437 | 9/1969 | Zane | 137/429 X |
| 2,143,204 | 1/1939 | McCormack | 137/414 X |
| 2,195,797 | 4/1940 | Groeniger | 137/441 X |
| 2,706,998 | 4/1955 | Bletcher et al. | 137/43 B |
| 3,135,287 | 6/1964 | Kepka et al. | 137/432 |
| 3,285,277 | 11/1966 | Goldtrap | 137/414 |

FOREIGN PATENTS OR APPLICATIONS

861,970   3/1961   Great Britain..........................251/46

*Primary Examiner*—Martin P. Schwadron
*Assistant Examiner*—David R. Matthews
*Attorney*—Gausewitz, Carr and Rothenberg

[57] ABSTRACT

A flow-controlling device that includes a housing having a chamber therein, a fluid inlet connected to the chamber, a first valve member in the chamber controlling flow through the inlet, the chamber having an outlet through which fluid discharges when the first valve member is moved in one direction, a pin extending through an opening in the first valve member and aligned with a second valve member in a second outlet for the chamber, a lever movable for opening the second valve member when the float drops, whereby the pressure in the chamber above the first valve member is relieved to allow the fluid pressure from the inlet to open the first valve member. When the float is raised, water can flow past the pin to pressurize the chamber interiorly and move the first valve member to a closed position.

5 Claims, 9 Drawing Figures

Patented April 24, 1973
3,729,017
2 Sheets-Sheet 1
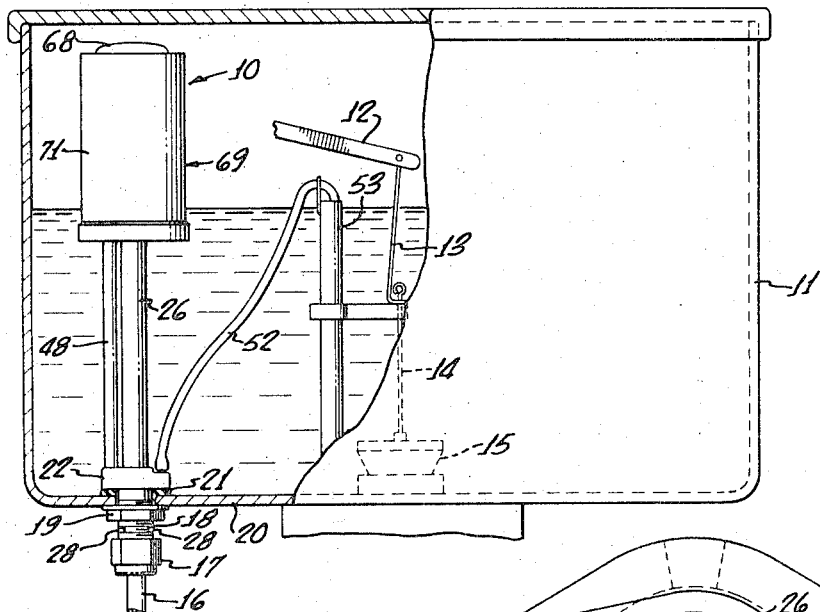
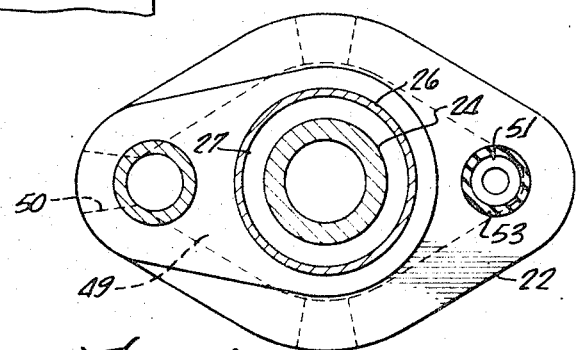
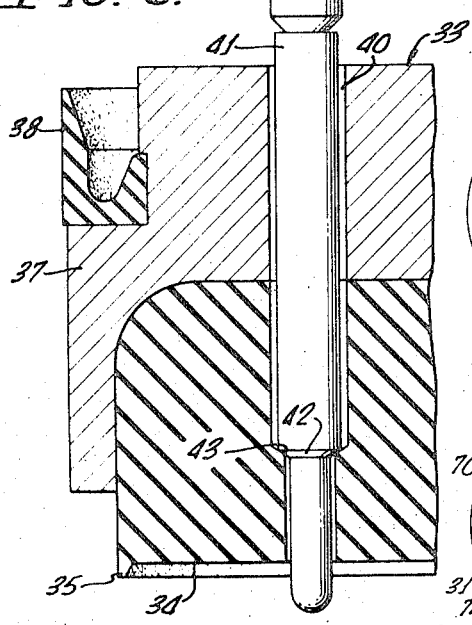
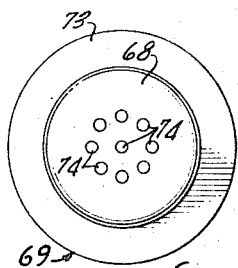
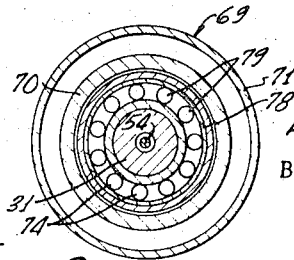
INVENTOR.
ANTHONY R. BRANDELLI
BY Jamewitz, Carr & Rothenberg
ATTORNEYS.

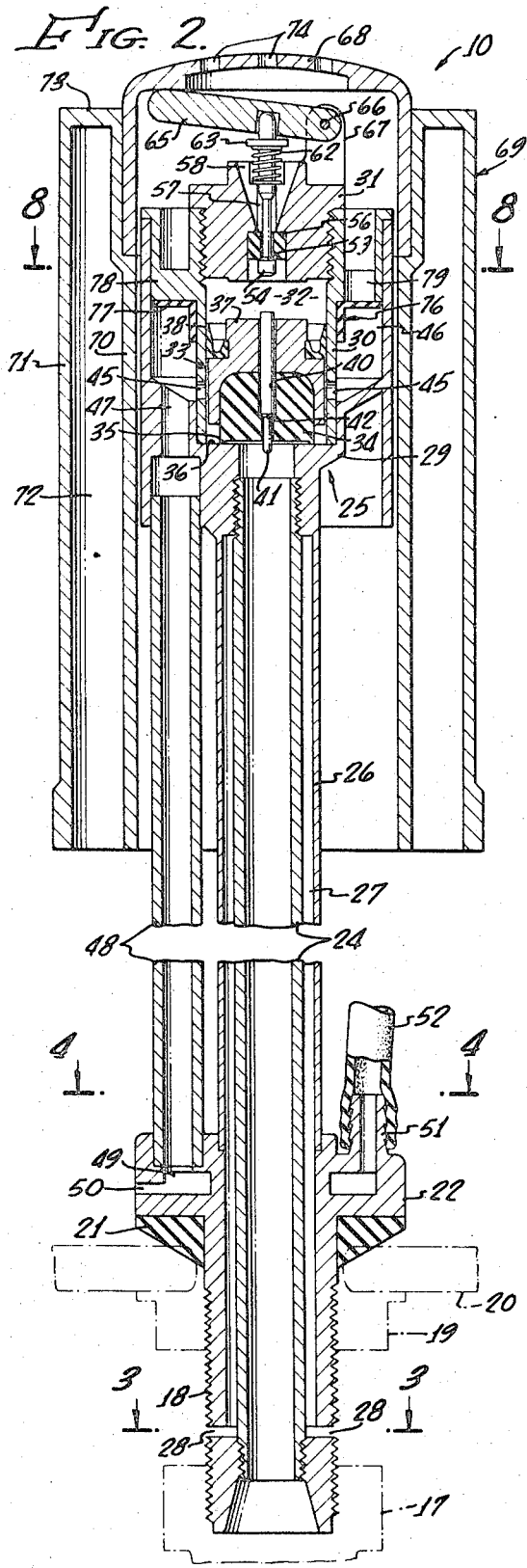
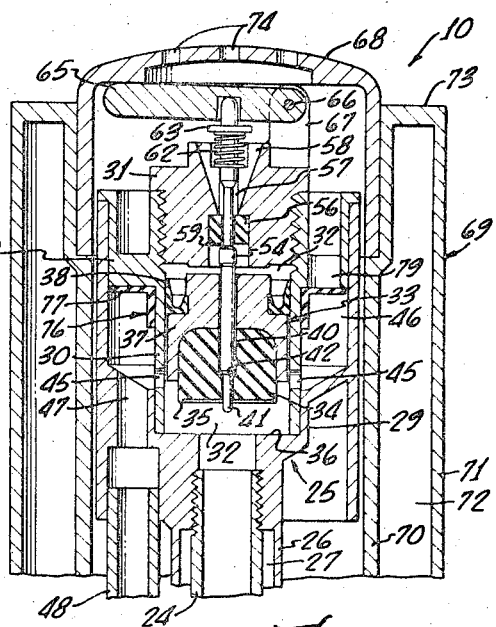
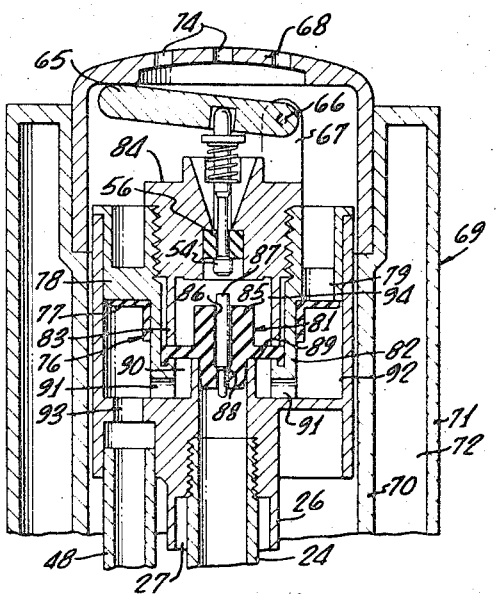
INVENTOR
ANTHONY R. BRANDELLI
ATTORNEYS.

FLOW-CONTROL DEVICE

REFERENCE TO RELATED APPLICATION:

This is a continuation of my copending patent application Ser. No. 726,164, filed May 2, 1968 now abandoned, for Flow Control Device.

BACKGROUND OF THE INVENTION

1. Field of the Invention

This invention relates to a flow-controlling device, in particular to a ball cock.

2. Description of Prior Art

The need for a reliable low-cost and properly operating ball cock for a water closet has led to considerable design effort in the past. Some of the more advanced versions have provided for hydraulic closing of the valve member of the ball cock, rather than the still prevalent arrangement in which a valve is actuated by a long arm connected to a float to be shut off when the float rises to a predetermined level. One of the difficulties with the latter construction is that the valve closes progressively and slowly, so that the rate of inflow of water into the flush tank gradually drops off until the shutoff point is reached. This adds to the time of filling the flush tank as well as tending to make the device noisy. Prior designs have required a connection between some sort of arm and the float used in actuating the valve and become inoperative of this connection is lost. They will not shut off in the absence of such connection. In one design, there is a slidable member which is gripped by an elastometric member in certain positions of the valve assembly, yet which must be released and moved axially as the valve is actuated.

SUMMARY OF THE INVENTION

The present invention provides an improved ball cock of simplified construction, particularly adapted for mass production at a low cost. At the same time, the device overcomes the difficulties of the prior art, providing a valve element that is operated positively and rapidly and an overall unit that is reliable in its operation. The device includes a housing at the upper end of the water inlet tube, within which is movable a valve element that, when seated, closes off the flow of water to outlet passages. A pin is reciprocative within an opening in the valve element and is seated on a beveled shoulder when the valve is closed. Above and aligned with the pin is a valve stem that controls the flow through an upper restricted passageway. The valve stem is in an upper and seated position when the assembly is closed. A lever engages the upper end of the valve stem and is, in turn, contacted by the float. There is not direct connection between the lever and the float, as the float merely rests upon the lever. The float is a compact low-cost device including parallel annular walls closed at the top and open at the bottom. Air is retained between the walls to provide buoyancy. The top of the float within the annular walls is provided with openings for venting and for supplying air to the antisiphon arrangement.

When the water in the tank recedes, the float causes the lever to move the stem to an open position, relieving the pressure in the chamber above the valve element. This permits the valve element to be opened by the hydraulic pressure beneath it, so that water flows to the interior of the tank. At the same time, the pin becomes unseated and held against the end of the valve stem. When the float rises and relieves the downward force on the valve stem, the valve at the upper end of the chamber becomes closed, so that the water in the chamber is static and under pressure. This forces the valve element to a closed position, where it is held hydraulically against its seat.

Also included in the ball cock of this invention is an antisiphon arrangement in which a thin deflectable member normally closes openings in the top wall of the outer water chamber. Reduction of pressure in the inlet line deflects the member to uncover the openings and allow air rather than water to flow in the reverse direction. With the antisiphon holes being in the top wall, they are a maximum distance from the water in the tank, giving greater assurance that no water will flow back from the tank into the inlet. Also, with the antisiphon holes normally closed, water will never be discharged through them. In prior designs where dynamic water pressure is needed to close the antisiphon openings, water can be discharged through them when the water velocity is insufficient to deflect the closure member to cover the openings.

An object of this invention is to provide an improved reliable and low-cost ball cock.

Another object of this invention is to provide a ball cock that provides full fluid flow through the tank-filling cycle, and is closed rapidly and smoothly by hydraulic action when the tank level is at the proper height.

A further object of this invention is to provide a ball cock having an improved valve action that includes an axially floating pin used in controlling the pressurization of the chamber where the hydraulic valve-actuating force is provided.

An additional object of this invention is to provide a ball cock having an improved float, and in which no connection is necessary between the valve mechanism and the float.

A still further object of this invention is to provide a ball cock having a valve element that is self-cleaning so that it will not become clogged or fail to operate after prolonged periods of use.

Another object of this invention is to provide a ball cock having an improved antisiphon arrangement to prevent reverse water flow into the water inlet.

Yet another object of this invention is to provide a ball cock in which the flow-controlling element is freely slidable and held in its different positions by hydraulic forces rather than being gripped or frictionally retained.

These and other objects will become apparent from the following detailed description taken in connection with the accompanying drawing.

BRIEF DESCRIPTION OF THE DRAWING:

FIG. 1 is a sectional view, partially in elevation, illustrating the ball cock of this invention as installed in a water closet tank;

FIG. 2 is an enlarged longitudinal sectional view of the ball cock of this invention, with the valve shown in the closed position;

FIG. 3 is a transverse sectional view taken along line 3—3 of FIG. 2;

FIG. 4 is a transverse sectional view taken along line 4—4 of FIG. 2;

FIG. 5 is a view similar to the upper portion of FIG. 2, but with the valve shown in the open position;

FIG. 6 is an enlarged fragmentary view of the valve elements in the position of FIG. 5;

FIG. 7 is a top plan view of the float;

FIG. 8 is a sectional view taken along line 8-8 of FIG. 2; and

FIG. 9 is a sectional view of the ball cock utilizing a diaphragm valve element instead of a piston.

DESCRIPTION OF THE PREFERRED EMBODIMENTS:

As shown in FIG. 1 of the drawing, the ball cock 10 of this invention is located in the flush tank 11 of a water closet. The remaining components of the assembly within the flush tank 11 may be of conventional design, including an arm 12 actuated by the flush lever (not shown) to raise lift wires 13 and 14 to unseat the valve 15, allowing the water to drain from the tank. Incoming water enters through a tube 16, which by a nut 17 is coupled to a threaded tubular shank 18 at the lower end of the ball cock assembly 10. A nut 19 also is threaded on the end fitting 18 to hold the unit to the lower wall 20 of the flush tank 11, with a seal being maintained by a gasket 21 beneath a base plate 22.

With reference now to FIG. 2, the water from the inlet line 16 enters a vertical tube 24, which at its lower end is threaded into the hollow interior of the shank 18. The upper end of the water inlet tube 24 threads into the lower end of a valve housing 25. Depending from the housing 25 is a tubular element 26 that at its lower end is received within a recess in the base plate 22. The tubular element 26 is spaced from the exterior of the inlet tube 24, so that there is an annulus 27 of open space around the tube 24. The interior of the tubular shank 18 provides a continuation of the annulus 27 beneath the end of the tubular element 26. A pair of slots 28 is provided through the wall of the fitting 18 to communicate with the annulus 27. These slots, shown also in FIG. 3, are above the nut 17 and below the nut 19 when the unit is assembled as in FIG. 1. Consequently, there is a vent from the space around the water inlet tube 27 to the atmosphere exteriorly of the flush tank 11. This is to provide an antisiphon feature to prevent water from being drawn from within the tank in the event that a vacuum is pulled in the water inlet line 16. For example, if there should be a pin hole in the inlet tube 24, and a vacuum should exist in the water line 16, the water from within the tank 11 will not be drawn from the tank back into the water main. Instead, air will be drawn by the vacuum through the slots 26 and the space 27 to enter the water inlet line.

The valve housing 25 includes a lower section 29 within which is an interior housing 30 that at its upper end receives a threaded cap 31. The members 25, 30 and 31 define a cylindrical chamber 32, within which is a piston assembly 33. The latter unit includes an elastomeric member 34 at its lower portion, which has a short annular flange 35 at its lower end adapted to seat against a radial shoulder 36 provided on the housing element 29. The elastomeric portion 34 is received in the body 37 of the piston, which also carries an elastomeric seal 38 which bears against the cylindrical wall of the chamber 32.

Extending vertically through the piston assembly 33 at its axis is an opening 40 which receives a floating pin 41. The pin 41 is of slightly smaller diameter than the opening 40, so that there is a narrow space around the pin 41. Toward the bottom portion of the pin 41, within the elastomeric member 34, there is a frustoconical section 42, beneath which the pin is of reduced diameter. The opening 40 in the element 34 includes a similarly inclined frustoconical portion 43 adapted to engagement by the section 42 of the pin 41. By being of smaller diameter than the opening 40, the pin 41, which acts as a valve, allows restricted flow through the opening 40 when it is unseated. This proportioning of the diameter of the pin and the opening also minimizes wear when the pin moves.

Extending through the circumferential wall of the housing element 30 are openings 45 which establish communication with an annular space 46 between the wall of the housing section 30 and that of the outer housing portion 29. The space 46 connects through a vertical opening 47 to a tube 48 that leads to the base 22. There, the tube 48 discharges into an annular passageway 49, which has an outlet opening 50 leading to the bottom portion of the flush tank 11. A fitting 51 on the base 22 connects the passageway 49 to a flexible tube 52 that leads to the upper end of an overflow pipe 53 (see FIG. 1).

Directly above and aligned with the pin 41 is a valve stem 54. This member extends through an opening 55 in an elastomeric member 56 carried by the cap 31, as well as an opening 57 in the cap 31. The opening 55 is only slightly larger than the valve stem 54, so that there is a restricted passageway around the valve stem. Slots 58 extend outwardly from the opening 57 to the upper end of the cap 31. The bottom end of the valve stem 54 is enlarged, with a frustoconical surface 59 being provided at the upper end of this portion. This surface is adapted to engage a complementary surface 60 on the elastomeric member 56 at the lower end of the opening 55.

The upper end of the opening 57 is counterbored to receive a compression spring 62. This spring bears against a washer 63 on the valve stem 54. Consequently, the valve stem 54 is biased upwardly to a position where the frustoconical surface 59 of the valve stem engages the similarly formed surface 60 on the elastomeric member 56. When so positioned, as illustrated in FIG. 2, communication outwardly of the chamber 32 through the openings 55 and 57 is closed. The spring 62 normally is not required, being included optionally for use where the water pressure is especially low, as will be explained more fully hereinafter.

The upper end of the valve stem 54 bears against the undersurface of a lever 65, which is mounted for pivotal movement about a pin 66 carried by a bracket 67 extending upwardly from the cap 31. The outer end of the lever 65, beyond the valve stem 54, is engaged by the undersurface of the upper dome section 68 of a float 69. The float is of annular configuration, including continuous, coaxial inner and outer walls 70 and 71, respectively, that define an air space 72 between them, closed at its upper end by a radial wall 73. The bottom end of the float is open. Thus, the float 69 is freely movable relative to the valve housing and is unconnected to the remainder of the ball cock, merely bearing against the outer end of the lever 65. The air within the space 72 provides the buoyancy for the float 69. Several openings 74 are provided through the dome portion 68 to vent the space within the wall 70 (see FIG. 7).

The float is a lightweight unit which is not artificially weighted as in prior designs. Many floats require water in the lower portion to produce sufficient weight to effect operation of the mechanism when the float drops. The float of this invention avoids this, thereby simplifying the float construction, allowing it to be made shorter and to be manufactured more economically. Less weight is imposed on the valve mechanism when the float is moved. Also, when water is retained in a float it does not circulate and, hence, becomes stagnant.

When the ball cock 10 of this invention is in the closed position of FIG. 2, pressure exists in the chamber 32, as will be explained more fully below, serving to hold the piston assembly 33 downwardly with the annular flange 35 of the elastomeric member 34 engaging the valve seat 36. Similarly, the pin 41 is held downwardly by the pressure in the chamber 32, so that the frustoconical surface 42 of the pin 41 engages the complementary seat 43 in the opening 40. Therefore, water cannot flow in the inlet tube 24.

When the tank outlet valve 15 subsequently is opened by the flushing mechanism, the water in the tank 11 will fall. As this occurs, the float 69 drops downwardly as it is no longer buoyed up by the water. When this downward movement takes place, the weight of the float 69 causes the lever 65 to move in the counterclockwise direction from the position of FIG. 2 to that of FIG. 5. As a result of this rotation of the lever 65, the valve stem 54 is moved downwardly. Consequently, the frustoconical surface 59 of the valve stem 54 is shifted away from the tapered seat 60 in the elastomeric member 56. This opens the passageway 55. The pressure then is released in the chamber 32, and water is free to escape through the restricted passageway 55 around the valve stem 54, and from the slots 58 to the exterior of the housing 25. Thus, the pressure in the chamber 32 drops to atmospheric pressure. The pressure of the water from the inlet tube 24 then immediately drives the pin 41 upwardly to engage the bottom end of the valve stem 54, unseating the pin 41 and its valve surface 42 from the tapered seat 43 in the elastomeric member 34. The water from the inlet tube 24, reacting against the lower end of the piston assembly 33 and without opposition from pressure within the chamber 32, also shifts the piston assembly upwardly to the position shown in FIG. 5. The piston 33 moves just after the pin 41 is forced upwardly, and as the piston 33 rises it reaches a position where the surface 42 of the pin again engages the seat 43. This shuts off all water flow through the chamber 32 and the upper passageway 55.

The upward movement of the piston 33 opens the main valve so that water is free to flow from the inlet tube 24, through the lower portion of the chamber 32, and to discharge from the ports 45 into the annular space 46. The water then continues downwardly through the opening 47 into the tube 48 and to the annular space 49 in the base 22. Some of the water flows outwardly into the tank through the opening 50. This allows the tank to be filled as the valve 15 drops back to its seat. A portion of the water also flows through the flexible tube 52 to the overflow pipe 53.

Within the chamber 46 is an L-shaped annular antisiphon washer 76. The radial portion 77 of this washer extends along the radial undersurface of a wall 78 included in the chamber portion 30. Several openings 79 extend through the wall 78 (see FIG. 8). When water flows into the annular space 46, it holds the radial flange 77 of the antisiphon washer 76 against the wall 78 so that the openings 79 are closed off. However, in the event that a vacuum should occur in the water inlet, the radial flange 77 of the antisiphon washer 76 will be pulled away from the wall 78 to allow air to be drawn through the openings 74 in the float 69 from the interior of the tank into the water passageway. This means that, should a vacuum occur, air will be drawn into the water inlet rather than permitting liquid to return from the tank to the water inlet. The air supplied to the water inlet during operation of the antisiphon arrangement flows from the tank through the openings 74 in the float 69 to the antisiphon holes 79. Thus, the openings 74 not only vent the interior of the float, but also transmit air for the antisiphon arrangement.

This antisiphon arrangement is advantageous in maintaining the antisiphon apertures normally closed, rather than open as in prior designs. When the antisiphon openings are left uncovered, with the closure member to be deflected by the flow of water to effect closure as in previous constructions, there is a possibility of discharging water through the antisiphon openings, rather than the normal water outlet, when the inlet flow is at low velocity. This occurs because the slowly flowing water will not deflect the closure member to the position where it blocks the apertures. Also, the present invention allows the use of a thin, readily deflectable closure member for the antisiphon arrangement, rather than the thicker element normally used which is required to withstand the dynamic pressure of the water flowing through the system. Another desirable feature of this antisiphon arrangement is that it positions the antisiphon openings in the top wall of the housing where they are as far as possible from the water in the tank. This gives greater assurance of proper operation in which air rather than water will be drawn through the openings in response to a reduction in pressure in the inlet line. The arrangement of this invention with the openings in the top wall also permits the ball cock to be made shorter and more compact.

When the water in the tank rises after the valve 15 has closed, ultimately it will lift the float 69 with it. As the float then moves upwardly, it releases the downward force from the end of the lever 65. The force of the water from the inlet tube 24 pushes the pin 41 upwardly and with it the valve stem 54. Consequently, the valve stem is moved back to a position where its frustoconical surface 59 engages the valve seat 60 in the elastomeric element 56. This closes off the upper end of the chamber 32 above the piston assembly 33. The compression spring 62 assists in this upward movement of the valve stem 54 to its seated position. As indicated above, however, normally the dynamic water pressure acting against the pin 41 will effect the closing of the valve stem 54, so that the inclusion of the spring 62 is precautionary, to be used particularly where the available pressure of the water is relatively low.

With the pin 41 having moved upwardly relative to the piston 33 in closing the valve stem 54, the surface 42 of the pin is shifted away from its seat 43. Therefore, water is free to flow through the restricted passageway 40 through the piston assembly into the upper portion of the chamber 32. With the upper end of the chamber 32 closed by the valve stem 54, the water builds up a pressure above the piston assembly 33 that forces the piston assembly 33 downwardly. This takes place because the zone beneath the piston assembly is open to the downstream water passageways, and hence is of lower pressure than that which exists above the piston assembly 33. Therefore, the pressure of the water above the piston assembly 33 moves the piston downwardly until the annular flange 35 at the bottom of the elastomeric element 34 engages the valve seat 36, which thereby shuts off communication to the ports 45 and, hence, to the interior of the tank 11. As this takes place, the pin 41 returns to its seated position where the water flow through the passageway 40 is shut off. Thus, all flow through the inlet line 24 is stopped.

In the static closed position, the entire top of the piston assembly 33 presents a pressure area which is reacted against by the water in the chamber 32. This is greater than the pressure area beneath the piston, which is only the area within the flange 35 of the member 34. Therefore, the valve is held closed by hydraulic pressure. Similarly, the pressure area on the upper end of the pin 41 is greater than that at the lower end beyond the beveled surface 42. Consequently, the pin 41 also is held seated by water pressure.

By this arrangement, therefore, the control valve of the ball cock is shut off rapidly and positively by hydraulic pressure as soon as the level in the flush tank has reached the proper height. Up until that time, full flow velocity is maintained through the inlet 24 and into the tank 11. Thus, there is a rapid filling that continues at a constant rate until the very last when the shutoff point is reached.

The pin 41 provides a valve element that also meters the flow to the chamber 32 above the piston 33 so that it fills at a controlled rate. The floating arrangement of the pin, with its reciprocative movement caused by hydraulic pressures, assures that it will move freely at the proper times. The shifting of the pin helps keep the passageway 40 clear of foreign matter. It is unnecessary to grip or otherwise mechanically position or hold the pin 41, which further reduces any likelihood of its failing to shift positions properly.

With the space above the piston 33 being vented to atmosphere as soon as the float 69 drops, the piston 33 opens with very little force. Thus, virtually no matter what pressure exists in the inlet tube 24, the valve 33 will be caused to open and the mechanism will proceed through its cycle.

In addition, the valve will close automatically if a vacuum is present in the inlet tube, resulting in an additional antisiphon provision. A vacuum in the tube 24 will merely pull the piston 33 down to the seated position, so that water will not flow from the interior of the tank 11 to the water main.

There is no direct connection between the float 67 and the valve-actuating mechanism. The float merely rests upon the end of the lever 65 when the water level drops, and relieves the downward force when the water rises. Consequently, the device is not dependent upon the maintenance of the connection with the float for actuation of the valve. In conventional designs, the float is in some manner connected to the valve mechanism and, if the connection is not maintained, the valve will not shut off. In the present invention, the valve will shut off even if the float is removed entirely. Moreover, the absence of a direct connection to the float means that there is no twisting or torque reaction imparted from the float to the valve operating lever. This contributes to free action and long life for the valve mechanism. Also, the float 69 is light in weight and does not require the addition of water to increase its mass.

These advantages are achieved with a design that is of relatively simple construction and readily manufactured at a low cost. Nearly all the parts of the ball cock 10 may be made of plastic, if desired, which has the added advantage of being noncorrosive. The ball cock 10, therefore, will last indefinitely in service. Furthermore, the proper antisiphon features are included with the device so that it will meet all code requirements in preventing return of water to the inlet.

The valve is well adapted to construction as a diaphragm-type rather than incorporating a sliding piston as in the embodiment of FIGS. 2, 3 and 4. The diaphragm valve has the advantage of minimizing friction, while assuring positive valve operation without danger of any element's becoming stuck and failing to move properly. The overall arrangement of the diaphragm valve, shown in FIG. 9, is generally the same as that of the piston-operated valve. This design, however, includes a diaphragm 81 held at its periphery in a recess in a housing element 82 by a depending tubular section 83 of the upper end cap 84. The central portion 85 of the diaphragm 81 is thickened and has extending through it an opening 86 similar to the opening 40 in the piston assembly 33. A pin 87 is received in the opening 86, this pin having a configuration comparable to that of the pin 41. Thus, it includes a beveled surface 88 adapted to seat against a complementary shoulder formed in the opening 86 in the central portion 85 of the diaphragm 81.

When the valve is closed, the undersurface of the diaphragm 81 adjacent the central portion 85 bears against an annular valve seat 89. Around the valve seat 89 is an annular opening 90 that communicates with radial ports 91. These, in turn, empty into an annular chamber 92 which, through an opening 93, connects to the conduit 48 that leads to the base 22 at the bottom of the tank 11.

When the valve is closed as shown in FIG. 7, the pressure in the chamber 94 above the diaphragm 81 holds the diaphragm downwardly against the valve seat 89. Also, the pin 87 is held downwardly in the seated position by the pressure in the chamber 94.

Then, when the float 69 drops downwardly as the water recedes, the valve action is the same as in the above-described embodiment. The valve stem 54 is shifted downwardly away from its seat, which relieves the pressure in the chamber 94. Then, the water in the inlet tube 24 forces the diaphragm upwardly off the seat 89. This provides an open passageway around the valve seat into the passageways 90, 91 and 92 and thence through the opening 93 into the tube 48.

Later, when the float 69 rises, the valve stem 54 is driven upwardly to its seated position by upward movement of the pin 87 under the impetus of the water flowing against the lower end of the pin. The chamber 94 becomes charged with water under pressure which forces the diaphragm 81 back downwardly against the seat 89. Also, the pin 87 is caused to seat as the valve in its entirety is shut off.

The foregoing detailed description is to be clearly understood as given by way of illustration and example only, the spirit and scope of this invention being limited solely by the appended claims.

I claim:

1. A flow-controlling device comprising
a housing having a chamber therein,
    said housing having
        an inlet for receiving fluid,
        a first outlet for discharging said fluid,
        and a second outlet,
    a first valve means in said chamber,
        said first valve means being movable between a first position closing said inlet and a second position remote from said inlet for allowing fluid to flow between said inlet and said first outlet, said first valve means having an opening therethrough communicating with said inlet,
    a pin slidably received in said opening,
        said first valve means at said opening having a seat intermediate the ends of said opening,
        said pin having a surface substantially complementary to said seat,
        said pin and said first valve means being relatively movable between an outward position of said pin in which said surface engages said seat and closes said opening for preventing flow through said opening and an inward position of said pin in which said surface is remote from said seat and allows flow through said opening into said chamber,
        said pin inwardly of said first valve means when said pin is in said outward position presenting a greater pressure area to fluid in said chamber than the pressure area thereof presented to fluid in said inlet, whereby pressurized fluid in said chamber can maintain said pin in said outward position thereof,
    a second valve means at said second outlet,
        said second valve means being movable between an outer position in which said second valve means closes said second outlet and an inner position in which said second valve means allows flow through said second outlet,
        said pin being engageable with said second valve means when said pin is in said inward position thereof,
    and means responsive to the level of water exteriorly of said housing for moving said second valve means to said inner position thereof in response to the dropping of said water level below a predetermined height, and releasing said second valve means upon the raising of said water level to said predetermined height,
    whereby when said second valve means is moved to said inner position thereof the pressure in said chamber inwardly of said first valve means is relieved so that pressure in said inlet moves said pin to said inward position thereof and moves said first valve means to said second position thereof for permitting fluid to flow to said first outlet,
    said first valve means when so moved to said second position thereof being moved relative to said pin so as to cause said pin to assume said outward position thereof for closing said opening in said first valve means and preventing flow through said first valve means,
    and when said means responsive to water level releases said second valve means said pin moves said second valve means to said outer position thereof and said chamber inwardly of said first valve means is pressurized by fluid from said inlet to move said first valve means to said first position thereof.

2. A device as recited in claim 1 in which
said first valve means when in said first position thereof presents a greater pressure area to fluid in said chamber than the pressure area presented to fluid in said inlet,
    whereby pressurized fluid in said chamber can maintain said first valve means in said first position.

3. A flow-controlling device comprising
a housing having a chamber therein,
    said housing having
        an inlet for receiving fluid,
        a first outlet for discharging said fluid,
        and a second outlet,
    a first valve means in said chamber,
        said first valve means being sealed relative to the periphery of said chamber and presenting a first side adjacent said inlet and said first outlet, and a second side adjacent said second outlet,
        said first valve means normally being in a first position closing said inlet and being movable in response to a predetermined pressure on said first side thereof relative to the pressure on said second side thereof to a second position remote from said inlet for permitting fluid to flow from said inlet to said first outlet,
        said first valve means having an opening therethrough communicating with said inlet, and having a seat,
    a floating valve member,
        said floating valve member normally engaging said seat for preventing fluid flow through said opening,
    a second valve means at said second outlet,
        said second valve means being movable between an outer position in which said second valve means closes said second outlet and an inner position in which said second valve means allows flow through said second outlet,
        said second valve means being normally remote from said floating valve member,
    means responsive to the level of fluid exteriorly of said housing for moving said second valve means to said inner position thereof in response to the dropping of said fluid level below a predetermined height,
    whereby the pressure is relieved on said second side of said first valve means, said floating valve member being movable in response to fluid pressure in said inlet to a position of engage-ment with said second valve means for urging said second valve means to said outer position thereof when said pressure is so relieved on said second side of said first valve means, said first valve means being movable to said second position thereof when said pressure is so relieved, whereby with said floating valve member so engaging said second valve means said floating valve member is held by said first valve means against said seat, said means responsive to the level of fluid exteriorly of said housing releasing said second valve means upon the raising of said fluid level to said predeter-mined height, whereby said floating valve member moves to a position remote from said seat and moves said second valve means to said outer position thereof, and fluid from said inlet passing through said opening pressurizes said chamber on said second side of said first valve means and moves said first vale means to said first position thereof and said floating valve member is returned to said normal engagement with said seat, and antisiphon means in said housing, said antisiphon means having air inlet means in the upper portion of said housing, said means responsive to the level of fluid exteriorly of said housing including a float having an annular buoyant portion around said housing, and an upper wall means inwardly of said annular buoyant portion and extending over said housing, said upper wall means having aperture means therethrough for permitting air to flow to said air inlet means and for venting the space within said annular buoyant portion.

4. A device as recited in claim 3 in which said annular buoyant portion is closed at the top and open at the bottom, whereby air is retained therein for imparting buoyancy thereto.

5. A flow-controlling device comprising a housing having a chamber therein, said housing having an inlet for receiving fluid, a first outlet for discharging said fluid, and a second outlet, a first valve means in said chamber, said first valve means being movable between a first position closing said inlet and a second position remote from said inlet for allowing fluid to flow between said inlet and said first outlet, said first valve means having an opening therethrough communicating with said inlet, a pin slidably received in said opening, said first valve means at said opening having a seat intermediate the ends of said opening, said pin having a surface substantially complementary to said seat, said pin being movable between an outward position in which said surface engages said seat and closes said opening and an inward position in which said surface is remote from said seat and allows flow through said opening into said chamber, a second valve means at said second outlet, said second valve means being movable between an outer position in which said second valve means closes said second outlet and an inner position in which said second valve means allows flow through said second outlet, said pin being engageable with said second valve means when said pin is in said inward position thereof, and means responsive to the level of water exteriorly of said housing for moving said second valve means to said inner position thereof in response to the dropping of said water level below a predetermined height, and releasing said second valve means upon the raising of said water level to said predetermined height, whereby when said second valve means is moved to said inner position thereof the pressure in said chamber inwardly of said first valve means is relieved so that pressure in said inlet moves said pin to said inward position thereof and moves said first valve means to said second position thereof for permitting fluid to flow to said first outlet, and when said means responsive to water level releases said second valve means said pins moves said second valve means to said outer position thereof and said chamber inwardly of said first valve means is pressurized by fluid from said inlet to move said first valve means to said first position thereof and said pin to said outward position thereof, said means responsive to the level of water exteriorly of said housing being a float, said float including an annular portion, said annular portion including a duality of spaced continuous sidewalls impervious to the flow of water, and an upper wall means closing the space between said duality of walls at the upper portions thereof thereby to define an annular chamber, said annular chamber being open at the bottom, said annular portion defining a space inwardly thereof, said upper wall means including a portion extending over said space, said portion having a vent opening therethrough.

* * * * *

UNITED STATES PATENT OFFICE
CERTIFICATE OF CORRECTION

PO-1050
(5/69)

Patent No. 3,729,017                    Dated April 24, 1973

Inventor(s) Anthony R. Brandelli

It is certified that error appears in the above-identified patent and that said Letters Patent are hereby corrected as shown below:

Column 11, line 3, "engage-ment" should read ---engagement---.

Column 11, line 25, "vale" should read ---valve---.

Column 12, line 35, "pins" should read ---pin---.

Signed and sealed this 19th day of March 1974.

(SEAL)
Attest:

EDWARD M. FLETCHER, JR.
Attesting Officer

C. MARSHALL DANN
Commissioner of Patents